United States Patent
Jeon et al.

(10) Patent No.: US 12,475,864 B2
(45) Date of Patent: Nov. 18, 2025

(54) METHOD FOR TRANSMITTING/RECEIVING INFORMATION USING MONITOR BRIGHTNESS CHANGE

(71) Applicant: ELECTRONICS AND TELECOMMUNICATIONS RESEARCH INSTITUTE, Daejeon (KR)

(72) Inventors: Yong-Sung Jeon, Daejeon (KR); Sang-Woo Lee, Daejeon (KR); Ha-Young Seong, Daejeon (KR); You-Sung Kang, Daejeon (KR); Ik-Kyun Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 282 days.

(21) Appl. No.: 18/337,295

(22) Filed: Jun. 19, 2023

(65) Prior Publication Data
US 2024/0144894 A1    May 2, 2024

(30) Foreign Application Priority Data
Nov. 2, 2022    (KR) .................. 10-2022-0144379

(51) Int. Cl.
*G09G 5/10*    (2006.01)

(52) U.S. Cl.
CPC ........... *G09G 5/10* (2013.01); *G09G 2370/04* (2013.01)

(58) Field of Classification Search
CPC .......................... G09G 5/10; G09G 2370/04
USPC .......................................... 345/690
See application file for complete search history.

(56) References Cited

U.S. PATENT DOCUMENTS

| | | |
|---|---|---|
| 2005/0283208 A1* | 12/2005 | Von Arx ............ A61N 1/37254 607/32 |
| 2012/0163594 A1 | 6/2012 | Moon et al. |
| 2012/0195425 A1 | 8/2012 | Kim et al. |
| 2016/0261765 A1* | 9/2016 | Roberts .............. H04N 1/32219 |
| 2016/0350889 A1* | 12/2016 | Reed .................... H04N 1/6005 |
| 2017/0103493 A1* | 4/2017 | Rodriguez ........... G07D 7/0057 |
| 2017/0154396 A1* | 6/2017 | Ankit ....................... G09C 5/00 |

FOREIGN PATENT DOCUMENTS

| | | |
|---|---|---|
| JP | 2018-121169 A | 8/2018 |
| KR | 10-2005-0099035 A | 10/2005 |
| KR | 10-2018-0035552 A | 4/2018 |
| KR | 10-2227317 B1 | 3/2021 |

* cited by examiner

*Primary Examiner* — Jonathan M Blancha (57) ABSTRACT

Disclosed herein is a method for transmitting information using a monitor brightness change. The method may include generating a transmission data frame structure for transmitting digital information, encoding the bit of the digital information, and converting the encoded bit of the digital information into a wireless signal that is a brightness change signal of blue (B) color, among red, green, and blue (RGB) for configuring colors on a monitor.

17 Claims, 6 Drawing Sheets

DATA(INFORMATION VALUE):  0    1    00    1111    000

DELAYED ENCODING: 00000111110000001111111​0000000

DEMODULATED BIT VALUE : 00000111110000001111111110000000
INFORMATION BIT VALUE :   0      1      00      1111      000

METHOD FOR TRANSMITTING/RECEIVING INFORMATION USING MONITOR BRIGHTNESS CHANGE

CROSS REFERENCE TO RELATED APPLICATION

This application claims the benefit of Korean Patent Application No. 10-2022-0144379, filed Nov. 2, 2022, which is hereby incorporated by reference in its entirety into this application.

BACKGROUND OF THE INVENTION

1. Technical Field

The present disclosure relates to a method for transmitting/receiving information using a change in the brightness of a monitor in order to secretly deliver information stored in a device.

2. Description of the Related Art

A covert channel for secretly transmitting information using a change in the brightness of a monitor screen and receiving the information using a camera, that is, a Display-to-Camera (D2C) covert channel, has recently received a lot of attention.

The D2C covert channel transfers sensitive data (e.g., an encryption key) after secretly modulating the same into a change in the brightness of a computer screen. Then, while a user is absent or is working on the computer, the modulated data is reconstructed from a video stream of a local security camera using video-processing technology.

However, in the case of a conventional communication system for covert channel transmission, when a light-emitting diode (LED) attached to a PC keyboard or device is exposed as much as can be captured by a camera, it is likely that an abnormal brightness change of the LED can be easily detected.

For example, if flickering of an LED of a scroll-lock key in a keyboard connected with a PC is used as the means of covert information transfer, there is a problem in which, when the LED flickers even though a user does not manipulate the keyboard, information may be leaked by a malicious insider or visitor.

Also, in the conventional method, information is transferred by modulating red color, among RGB colors of an LED, by a maximum of 3%, but because a change in the brightness of red color is easily discovered by human eyes, there is a problem in which information may be leaked by a malicious insider or visitor.

Also, in the conventional method, the transfer rate of information using a change in the brightness of a monitor screen is set to 10 bps, but it causes the screen to flicker for a very short time, so there is a problem in which a change in the brightness of the screen may be easily detected.

SUMMARY OF THE INVENTION

An object of the present disclosure is to provide an information transmission and reception method using a monitor brightness change that can be detected and identified by only a transmitter and a receiver.

Another object of the present disclosure is to provide an information transmission and reception method that uses a monitor brightness change but minimizes the monitor brightness change such that outsiders cannot easily identify the monitor brightness change.

In order to accomplish the above objects, a method for transmitting information using a monitor brightness change according to an embodiment may include generating a transmission data frame structure for transmitting digital information, encoding a bit of the digital information, and converting the encoded bit of the digital information into a wireless signal that is a brightness change signal of blue (B) color, among red, green and blue (RGB) for configuring colors on a monitor.

The transmission data frame structure may include at least one of a Start Frame Delimiter (SFD) field, a header field, a payload field, or a CRC field, or a combination thereof.

Encoding the bit of the digital information may comprise, when the value of the digital information is changed, encoding the value of the digital information into multiple bits, each of which is identical to the value of the digital information. The multiple bits may include five bits.

Encoding the bit of the digital information may comprise, when the value of the digital information is not changed, encoding the value of the digital information into a single bit, the value of which is identical to the value of the digital information.

When the encoded bit of the digital information is 0, brightness of the monitor may not be changed, but when the encoded bit of the digital information is 1, brightness of B color, among RGB for configuring colors on the monitor, may be changed.

Also, a method for receiving information using a monitor brightness change according to an embodiment may include extracting a digital bit value from a brightness change signal of B color, among RGB for configuring colors on a monitor, extracting an information bit value from the digital bit value, and extracting a payload from the information bit value.

Extracting the digital bit value may include calculating an average brightness value of B color for a certain time; and comparing an average brightness value of B color calculated at a specific time with average of average brightness values of B color calculated N times and changing an output value.

When the average brightness value of B color calculated at the specific time falls within a preset output value change range M times in a row, the output value may be changed to 1.

When the average brightness value of B color calculated at the specific time is below a preset output value change range, the output value may be maintained at 0.

When the average brightness value of B color calculated at the specific time is above a preset output value change range, averaging average brightness values of B color may be performed again N+M times while maintaining the output value at 0.

The maximum value of the output value change range may be a brightness change value at a transmission time, and the minimum value thereof may be set to ⅓ of the maximum value of the output value change range.

Also, a method for transmitting/receiving information using a monitor brightness change according to an embodiment may include transmitting a covert channel by generating a transmission data frame structure for transmitting digital information, by encoding a bit of the digital information, and by converting the encoded bit of the digital information into a wireless signal that is a brightness change signal of B color, among RGB for configuring colors on a monitor; and receiving the covert channel by extracting a digital bit value from the brightness change signal of B color, among RGB for configuring colors on the monitor, by extracting an information bit value from the digital bit value, and by extracting a payload from the information bit value.

When the value of the digital information is changed, the value of the digital information may be encoded into five bits, each of which is identical to the value of the digital information, and when the value of the digital information is not changed, the value of the digital information may be encoded into a single bit, the value of which is identical to the value of the digital information.

When the encoded bit of the digital information is 0, brightness of the monitor may not be changed, but when the encoded bit of the digital information is 1, the encoded bit may be converted into the wireless signal by changing brightness of B color, among RGB for configuring colors on the monitor.

Extracting the digital bit value may include calculating an average brightness value of B color for a certain time; and comparing an average brightness value of B color calculated at a specific time with average of average brightness values of B color calculated N times and changing an output value.

When the average brightness value of B color calculated at the specific time falls within a preset output value change range M times in a row, the output value may be changed to 1.

When the average brightness value of B color calculated at the specific time is below a preset output value change range, the output value may be maintained at 0.

When the average brightness value of B color calculated at the specific time is above a preset output value change range, averaging average brightness values of B color may be performed again N+M times while maintaining the output value at 0.

The maximum value of the output value change range may be a brightness change value at a transmission time, and the minimum value thereof may be set to ⅓ of the maximum value of the output value change range.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

Figure 1:
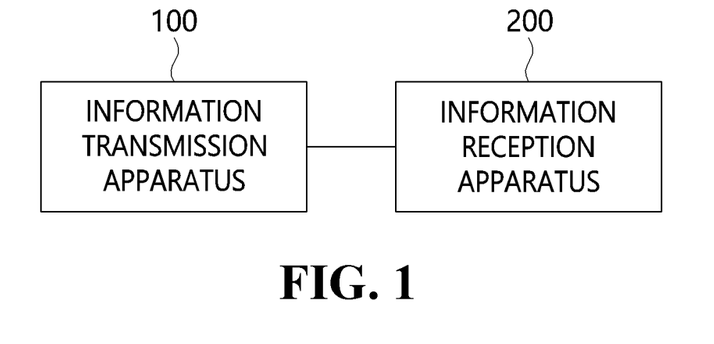
FIG. 1 is a block diagram illustrating an information transmission/reception system according to an embodiment.

FIG. 1 is a block diagram illustrating an information transmission/reception system according to an embodiment.

Referring to FIG. 1, an information system apparatus according to an embodiment may include an information transmission apparatus 100 and an information reception apparatus 200.

The information transmission apparatus 100 may serve to transmit digital information using a covert wireless signal.

The information transmission apparatus 100 may perform processes of covert formatting, covert encoding, and covert modulation.

Covert formatting may be the process of generating a transmission data frame structure by concatenating various fields required for transmission of digital information. Covert encoding may be the process of encoding digital information bits in order to reduce generation of wireless covert signals as much as possible and to detect and correct an error in a communication channel. Covert modulation may be the process of converting the encoded bits into an actual wireless signal.

The information transmission apparatus 100 may generate a covert wireless signal using a change in the brightness of blue (B) color, among RGB colors of a monitor.

The information reception apparatus 200 may receive the generated wireless signal from the information transmission apparatus 100. The information reception apparatus 200 may perform processes of covert demodulation, covert decoding, and covert de-formatting.

Covert demodulation may be the process of extracting a digital bit value from an analog signal that is a monitor brightness change. Covert decoding may be the process of extracting an information bit value from the digital bit value. Covert de-formatting may be the process of extracting final digital information by extracting a payload from a sequence of information bit values.

Hereinafter, an information transmission method performed in an information transmission apparatus according to an embodiment will be described in detail.

Figure 2:
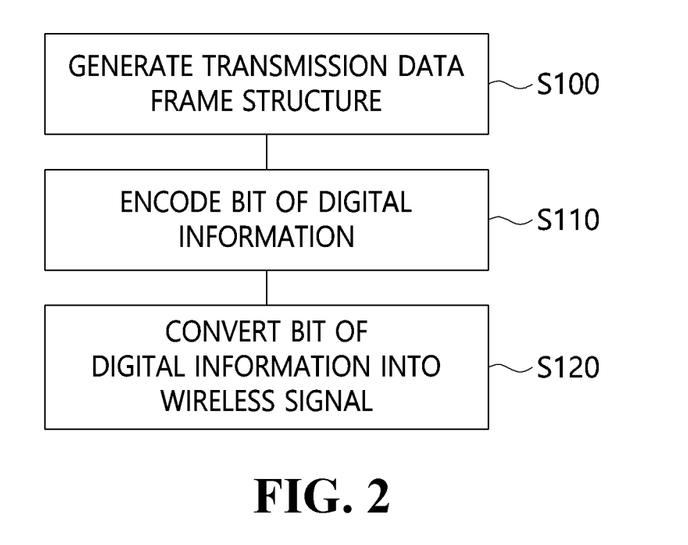
FIG. 2 is a flowchart illustrating an information transmission method performed in an information transmission apparatus according to an embodiment.

FIG. 2 is a flowchart illustrating an information transmission method performed in an information transmission apparatus according to an embodiment.

The information transmission apparatus according to an embodiment may generate a transmission data frame structure for transmitting digital information at step S100.

Figure 3:
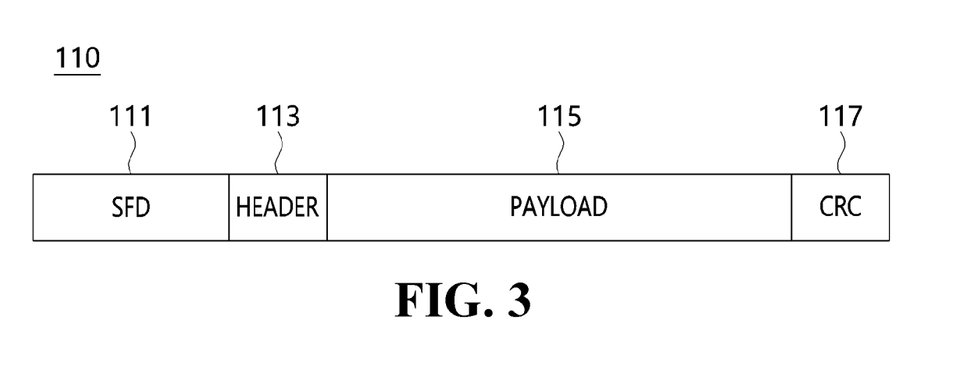
FIG. 3 is a block diagram illustrating a data frame structure according to an embodiment.

FIG. 3 is a block diagram illustrating a data frame structure according to an embodiment.

As illustrated in FIG. 3, the structure of a data frame 110 may include a Start Frame Delimiter (SFD) field 111, a header field 113, a payload field 115, and a CRC field 117.

The SFD field 111 may be a field indicating the start of the frame. The SFD field 111 may be a field having a length of two bytes. The SFD field 111 may be set to, for example, a value of 0x00 0xA5, but is not limited thereto.

The header field 113 may be a field indicating the data length of the payload, which is actual digital information. The header field 113 is a one-byte field, and may be divided into two parts. The header field 113 may include a 3-bit MSB part and a 5-bit LSB part.

The 3-bit MSB part may indicate the number of repetitions of transmission of information, and may be counted down to "000" from the initial value thereof. The reason why the same information is repeatedly transmitted is that a transmitter never knows whether reception is successful because the covert channel communication is one-way communication and that the possibility of failure in reception is increased when the monitor screen is changed. The 5-bit LSB part may be set to the length of the payload.

The payload field 115 is a field for carrying digital information, and may have a length of at most 31 bytes.

The CRC field 117 may be a one-byte field for checking whether the received data has an error. The CRC field 117 may contain a result of a CRC operation performed on the header field 113 and the payload field 115. When there is a CRC error, the fields of the corresponding data frame may be discarded.

Referring back to FIG. 2, the information transmission apparatus according to an embodiment may encode the output digital information in order to reduce generation of a wireless signal as much as possible and detect or correct an error in a communication channel at step S110.

A common reason for performing an encoding step is to enable restoration even when a part of the transmitted bit value is lost during transmission or even when an error occurs in the process of determining whether the bit value is '0' or '1'.

However, in the case of a covert channel using a change to the brightness of a monitor screen, encoding is performed with the purpose of preventing the covert channel from being easily discovered, unlike the purpose of general encoding. That is, because human eyes can easily sense even a slight change in the brightness, a slight change in the brightness of a monitor may be easily sensed.

Particularly, the quicker the change is made, the more easily the change can be discovered. Therefore, in the case of a covert channel using a brightness change, it is important to minimize the magnitude of the change and to make an interval of the change as long as possible.

That is, minimizing the magnitude of a brightness change is advantageous to hiding a covert channel, but at least a minimum change to make it possible to receive the covert channel is required. The suitable magnitude of a brightness change will be described in detail later in the covert modulation step.

Also, making an interval between brightness changes as long as possible is advantageous to hiding a covert channel. That is, it is necessary to change the brightness after the brightness is maintained at the same level as long as possible. However, when the time interval between brightness changes is increased, it may cause a problem in which the transfer rate of the covert channel is significantly decreased.

Consequently, a method capable of ensuring an appropriate transfer rate while increasing the time interval between brightness changes is required. In order to satisfy these conditions, the encoding method in an embodiment may be configured as shown in FIG. 4.

Figure 4:
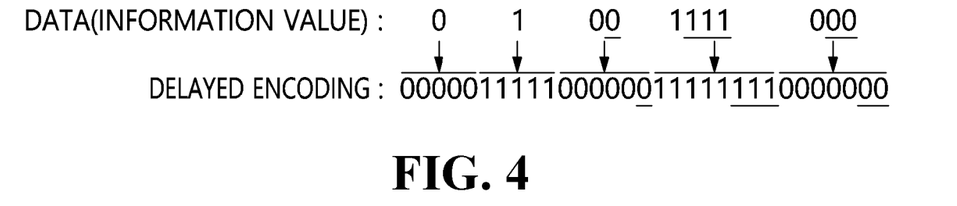
FIG. 4 is a view for explaining a process of encoding the bit of digital information according to an embodiment.

FIG. 4 is a view for explaining a process of encoding a bit of digital information according to an embodiment.

As illustrated in FIG. 4, when a digital information value is changed (that is, when it is changed from '0' to '1' or from '1' to '0'), the digital information value may be encoded into five bits, each of which is the same as the digital information value.

Conversely, when the digital information value is not changed (that is, when it is maintained constant, e.g., from '0' to '0' or from '1' to '1'), the digital information value may be encoded into a one-bit value that is the same as the digital information value.

The embodiment intends to maintain the encoded value constant during a certain time period even when the digital information value rapidly changes. This encoding method may be referred to as 'delayed encoding'. However, the number of encoded bits may be set differently depending on the circumstances.

Referring back to FIG. 2, the information transmission apparatus according to an embodiment may convert the encoded bit of the digital information into an actual wireless signal at step S120. Here, the wireless signal may be a monitor brightness signal.

Figure 5:
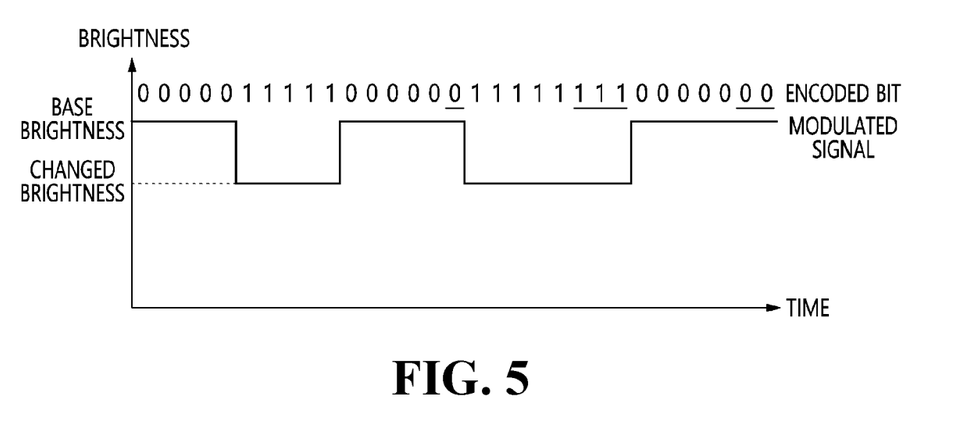
FIG. 5 is a view for explaining a process of modulating blue color according to an embodiment.

FIG. 5 is a view for explaining a process of modulating blue color according to an embodiment.

As illustrated in FIG. 5, brightness of blue (B) color, among three primary colors including red, green, and blue that are components for generating colors on a monitor, may be changed using the encoded bits in an embodiment.

Human eyes perceive nonlinear RGB colors in different proportions. Human eyes are most sensitive to green, and are more sensitive to red than blue. Here, when the sensitivity to color is represented as a percentage, the sensitivity to red (R) may be 30%, the sensitivity to green (G) may be 59%, and the sensitivity to blue (B) may be 11%. Accordingly, when a covert channel is implemented using blue (B) color, human eyes cannot easily sense a brightness change of blue color.

Hereinafter, an information reception method performed in an information reception apparatus according to an embodiment will be described in detail.

Figure 6:
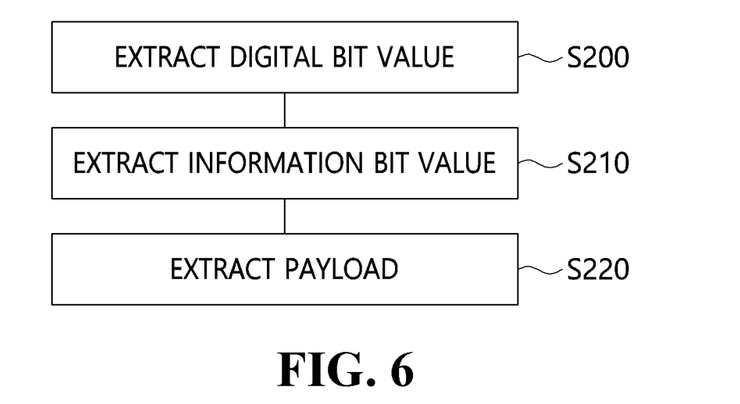
FIG. 6 is a flowchart illustrating an information reception method performed in an information reception apparatus according to an embodiment.

FIG. 6 is a flowchart illustrating an information reception method performed in an information reception apparatus according to an embodiment.

As illustrated in FIG. 6, the information reception apparatus according to an embodiment may extract a digital bit value from a monitor brightness change signal, which is a wireless signal received from an information transmission apparatus, at step S200.

Figure 7:
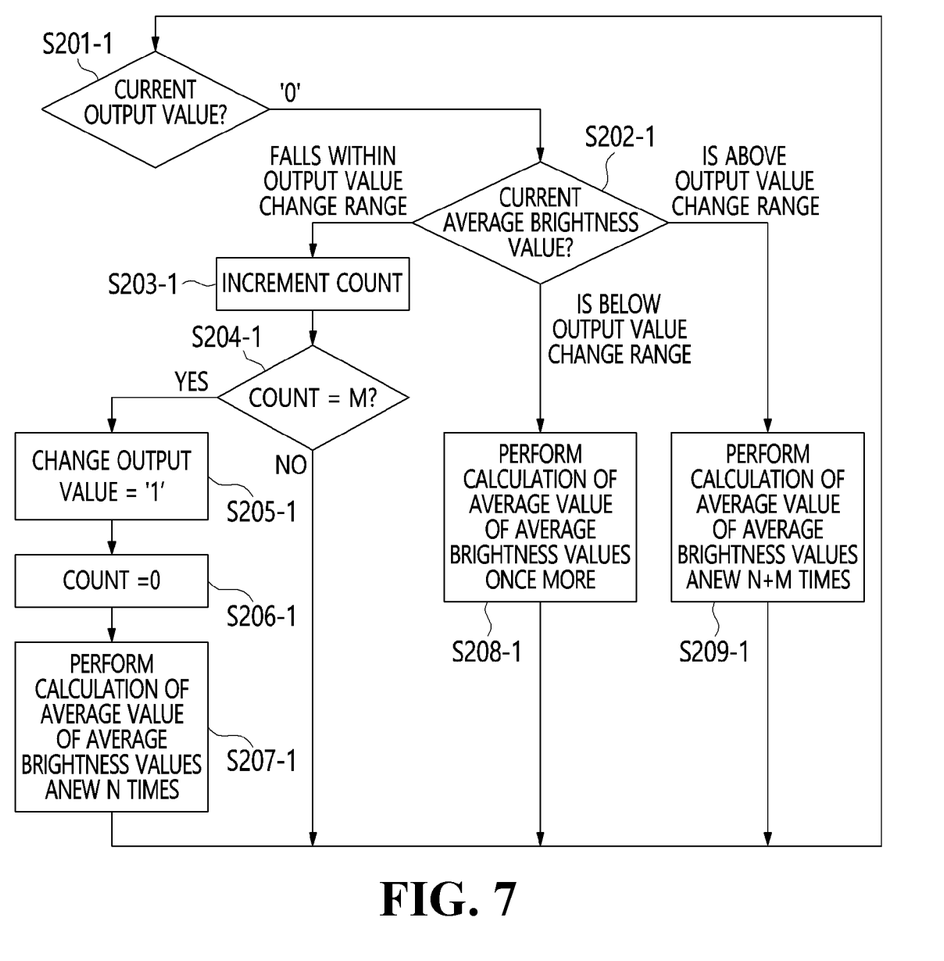
FIG. 7 and FIG. 8 are flowcharts illustrating a process of extracting a digital bit value from a monitor brightness change signal according to an embodiment.
Figure 8:
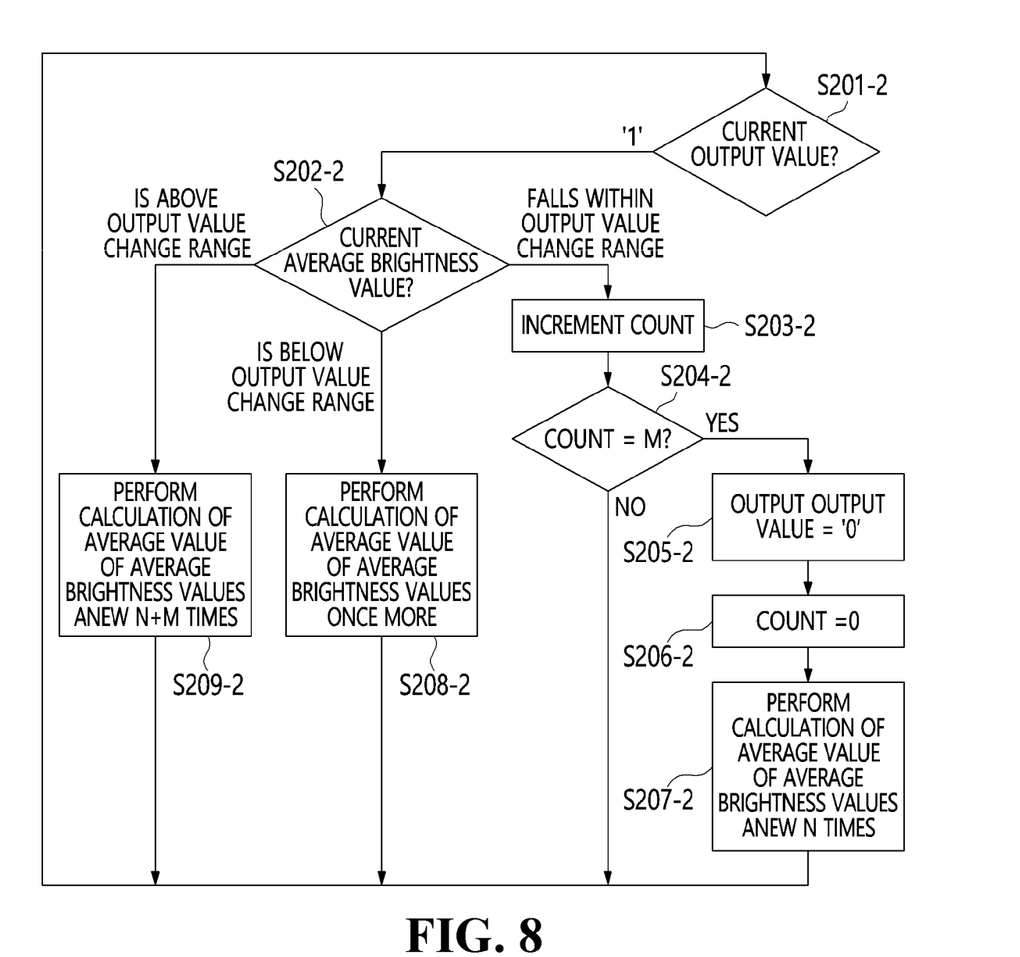

FIG. 7 and FIG. 8 are flowcharts illustrating a process of extracting a digital bit value from a monitor brightness change signal according to an embodiment.

As illustrated in FIG. 7, when a current output bit value is '0' at step S201-1, a currently calculated average brightness value of B color on a monitor may be checked at step S202-1. That is, the currently calculated average brightness value may be compared with the average value of the average brightness values calculated N times up to the present time.

That is, the currently calculated average brightness value is compared with the average brightness value accumulated N times, whereby how much the brightness changes may be checked. To this end, a range for checking whether the brightness changes enough to change the output digital value (hereinafter, referred to as an 'output value change range') may be set in advance.

Figure 9:
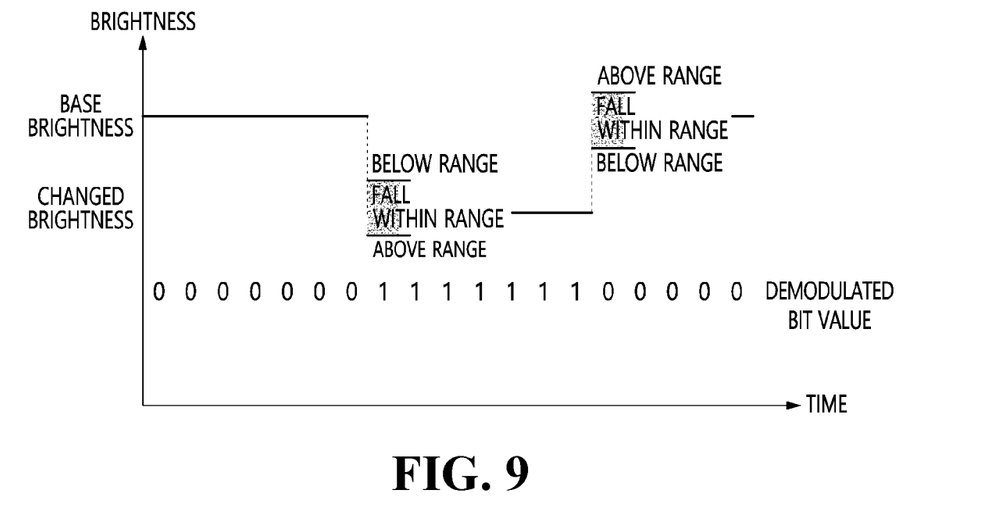
FIG. 9 is a graph for explaining a demodulation method depending on an output change range according to an embodiment.

FIG. 9 is a graph for explaining a demodulation method depending on an output change range according to an embodiment.

As illustrated in FIG. 9, because sensitivity of an image captured using a reception camera is lower than that of the original image, a brightness change by a covert channel at a reception time cannot exceed a brightness change at a transmission time. Therefore, the maximum value of the 'output value change range' may be the brightness change value at the transmission time. Also, the minimum value of the 'output value change range' may be acquired through tests in consideration of a natural brightness change depending on the circumstances, various types of noise, and the like, and may be set to about ⅓ of the maximum value.

Referring back to FIG. 7, when the currently calculated average brightness value of B color falls within the preset 'output value change range', this may indicate that a brightness change enough to change the output value to ' 1' has been made. However, when the average brightness value of B color falls within the range only once, a count for calculation of the average brightness value is incremented at step S203-1, rather than immediately changing the output value to '1'. Then, when the average brightness value falls within this range M times in a row at step S204-1, the output value may be changed to '1' at step S205-1.

Subsequently, the count is reset to '0' at step S206-1, and averaging the average brightness values may be performed anew N times at step S207-1.

When the currently calculated average brightness value of B color is below the 'output value change range', this may indicate that the brightness change that is made is less than a brightness change enough to change the output value to '1'. That is, there is no change in the brightness or the brightness is slightly changed by noise or ambient lightning, so the output value may be maintained at '0' at step S208-1.

When the currently calculated average brightness value of B color is above the 'output value change range', this may indicate that the brightness change that is made exceeds a brightness change enough to change the output value to '1'. In this case, the brightness change is greater than the brightness change by the transmission signal of the covert channel, which may correspond to the case in which a user changes the screen to another screen. That is, it may indicate that the average brightness of B color on the entire screen will be changed to be higher than the previous screen. In this case, the average of the average brightness values may be calculated anew N+M times while maintaining the output value at '0' at step S209-1. Here, N may indicate the number of average brightness values of B color on the monitor that are used for calculating the average.

Similarly, when the current output bit value is '1' at step S201-2, the currently calculated average brightness value of B color on the monitor may be checked at step S202-2, as illustrated in FIG. 8. That is, the currently calculated average brightness value may be compared with the average value of the average brightness values calculated N times up to the present time.

When the currently calculated average brightness value of B color falls within the preset 'output value change range', the count for calculation of the average brightness value is incremented at step S203-2, and only when the average brightness value falls within this range M times in a row at step S204-2 may the output value be changed to '0' at step S205-2.

Subsequently, the count is reset to 0 at step S206-2, and averaging the average brightness values may be performed anew N times at step S207-2.

When the currently calculated average brightness value of B color is below the 'output value change range', the output value may be maintained at ' 1' without change at step S208-2.

When the currently calculated average brightness value of B color is above the 'output value change range', the average of the average brightness values may be calculated anew N+M times while maintaining the output value at '1' at step S209-2.

Referring back to FIG. 6, the information reception apparatus according to an embodiment may extract an information bit value from the digital bit value, which is generated at the covert demodulation step, at step S210.

Figure 10:
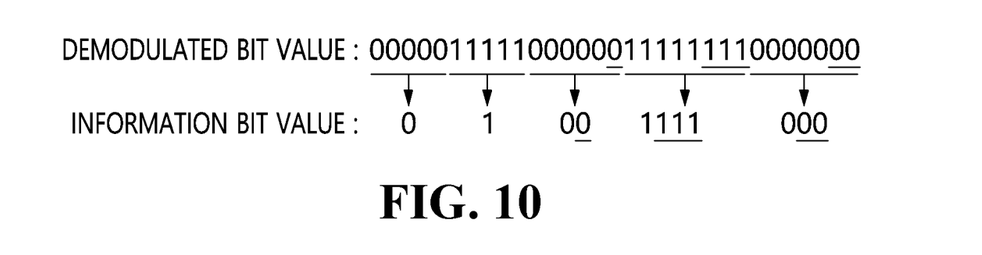
FIG. 10 is a view for explaining a process of extracting an information bit from a digital bit value according to an embodiment.

FIG. 10 is a view for explaining a process of extracting an information bit from digital bit values according to an embodiment.

As illustrated in FIG. 10, an information bit value may be extracted using the number of demodulated digital bit values. For example, the information bit value is encoded into five bits when it is changed or the information bit value is encoded into a single bit when it is not changed. Accordingly, the information bit value may be extracted based on the number of encoded digital bit values.

Referring back to FIG. 6, the information reception apparatus according to an embodiment may extract a payload from the information bit values at step S220.

The information reception apparatus according to an embodiment may receive a data frame such as that illustrated in FIG. 3 and extract a payload part containing digital information from the received data frame structure.

After it receives the entirety of the data frame, the information reception apparatus according to an embodiment may compare the received CRC value with a calculated CRC value, and may then determine that the received payload value is valid when the received CRC value is equal to the calculated CRC value.

Each of the information transmission apparatus and the information reception apparatus according to an embodiment may be implemented in a computer system including a computer-readable recording medium.

Figure 11:
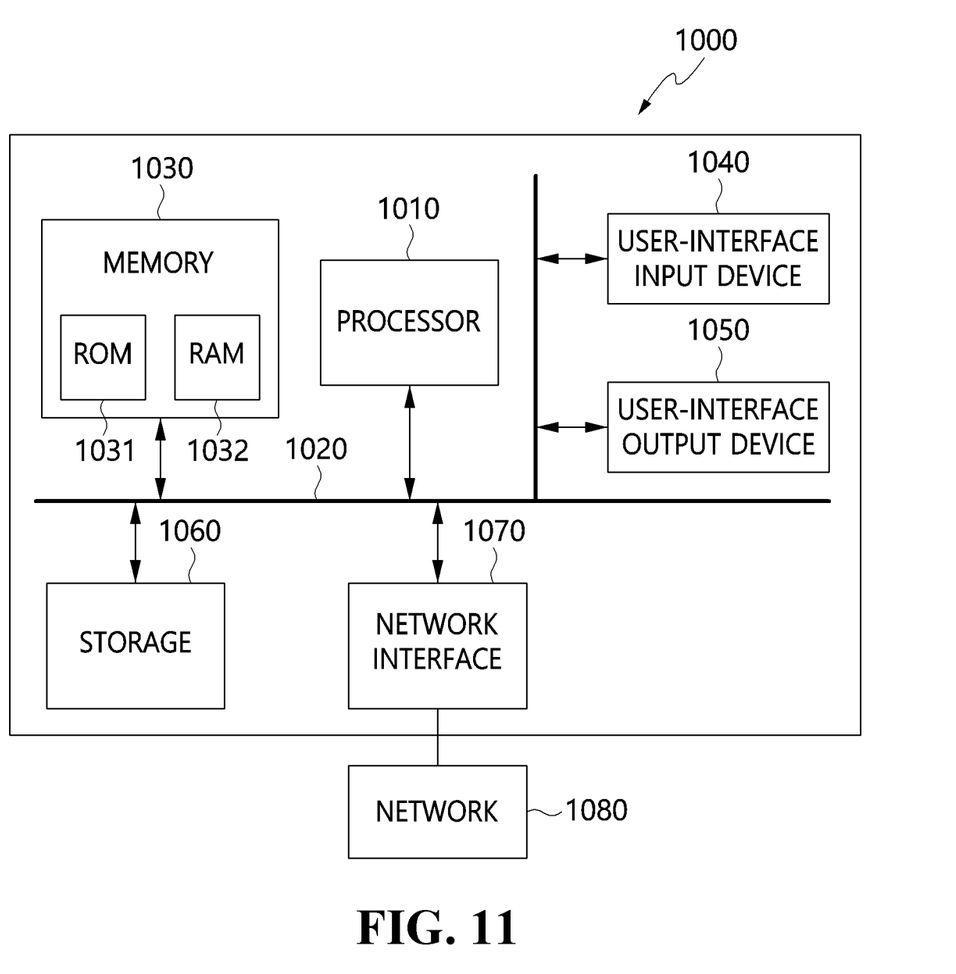
FIG. 11 is a block diagram illustrating the configuration of a computer system according to an embodiment.

FIG. 11 is a block diagram illustrating the configuration of a computer system according to an embodiment.

Referring to FIG. 11, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation of the information transmission apparatus or the information reception apparatus.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing the method according to an embodiment. Specifically, the memory may store multiple applications running in the information transmission apparatus or the information reception apparatus and data and instructions for operation of the information transmission apparatus or the information reception apparatus.

The memory 1030 and the storage 1060 may be storage media including at least one of a volatile medium, a nonvolatile medium, a detachable medium, a non-detachable medium, a communication medium, or an information delivery medium, or a combination thereof. For example, the memory 1030 may include ROM 1031 or RAM 1032.

An embodiment transfers information using a change in the brightness of blue color, among colors on a monitor screen, thereby preventing sensitive data from being leaked by an outsider.

Also, an embodiment controls a transfer rate of a change in the brightness of a monitor screen, thereby preventing the change in the brightness of the monitor screen from being easily detected.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for transmitting information, comprising:
generating a transmission data frame structure for transmitting digital information;
encoding a bit of the digital information; and
converting the encoded bit of the digital information into a wireless signal that is a brightness change signal of blue (B) color, among red, green and blue (RGB) for configuring colors on a monitor,
wherein, when the encoded bit of the digital information is 0, brightness of the monitor is not changed, but when the encoded bit of the digital information is 1, brightness of the B color, among RGB for configuring colors on the monitor, is changed.

2. The method of claim 1, wherein the transmission data frame structure includes at least one of a Start Frame Delimiter (SFD) field, a header field, a payload field, or a CRC field, or a combination thereof.

3. The method of claim 1, wherein encoding the bit of the digital information comprises, when a value of the digital information is changed, encoding the value of the digital information into multiple bits, each of which is identical to the value of the digital information.

4. The method of claim 3, wherein the multiple bits include five bits.

5. The method of claim 1, wherein encoding the bit of the digital information comprises, when a value of the digital information is not changed, encoding the value of the digital information into a single bit, a value of which is identical to the value of the digital information.

6. A method for receiving information, the method comprising:
extracting a digital bit value from a brightness change signal of blue (B) color, among red, green, and blue (RGB) for configuring colors on a monitor;
extracting an information bit value from the digital bit value; and
extracting a payload from the information bit value,
wherein extracting the digital bit value includes:
calculating an average brightness value of B color for a certain time; and
comparing an average brightness value of B color calculated at a specific time with average of average brightness values of B color calculated N times and changing an output value.

7. The method of claim 6, wherein, when the average brightness value of B color calculated at the specific time falls within a preset output value change range M times in a row, the output value is changed to 1.

8. The method of claim 6, wherein, when the average brightness value of B color calculated at the specific time is below a preset output value change range, the output value is maintained at 0.

9. The method of claim 6, wherein, when the average brightness value of B color calculated at the specific time is above a preset output value change range, averaging average brightness values of B color is performed again N+M times while maintaining the output value at 0.

10. The method of claim 7, wherein a maximum value of the output value change range is a brightness change value at a transmission time, and a minimum value thereof is set to ⅓ of the maximum value of the output value change range.

11. A method for transmitting/receiving information, comprising:
- generating a transmission data frame structure for transmitting digital information, encoding a bit of the digital information, and converting the encoded bit of the digital information into a wireless signal that is a brightness change signal of blue (B) color, among red, green, and blue (RGB) for configuring colors on a monitor, thereby transmitting a covert channel; and
- extracting a digital bit value from the brightness change signal of B color, among RGB for configuring colors on the monitor, extracting an information bit value from the digital bit value, and extracting a payload from the information bit value, thereby receiving the covert channel,
- wherein extracting the digital bit value includes
  - calculating an average brightness value of B color for a certain time; and
  - comparing an average brightness value of B color calculated at a specific time with average of average brightness values of B color calculated N times and changing an output value.

12. The method of claim 11, wherein, when a value of the digital information is changed, the value of the digital information is encoded into five bits, each of which is identical to the value of the digital information, and when the value of the digital information is not changed, the value of the digital information is encoded into a single bit, a value of which is identical to the value of the digital information.

13. The method of claim 12, wherein, when the encoded bit of the digital information is 0, brightness of the monitor is not changed, but when the encoded bit of the digital information is 1, the encoded bit is converted into the wireless signal by changing brightness of B color, among RGB for configuring colors on the monitor.

14. The method of claim 11, wherein, when the average brightness value of B color calculated at the specific time falls within a preset output value change range M times in a row, the output value is changed to 1.

15. The method of claim 14, wherein a maximum value of the output value change range is a brightness change value at a transmission time, and a minimum value thereof is set to ⅓ of the maximum value of the output value change range.

16. The method of claim 11, wherein, when the average brightness value of B color calculated at the specific time is below a preset output value change range, the output value is maintained at 0.

17. The method of claim 11, wherein, when the average brightness value of B color calculated at the specific time is above a preset output value change range, averaging average brightness values of B color is performed again N+M times while maintaining the output value at 0.

\* \* \* \* \*